May 1, 1951  R. W. KING ET AL  2,550,698
AUTOMATIC REFLEX CAMERA WITH DIAPHRAGM ADJUSTMENT
AND FLASH SYNCHRONIZER MEANS
Filed Sept. 12, 1945  6 Sheets-Sheet 1

*INVENTOR.*
ROLLIN W. KING
EMMANUEL BERLANT
BY
William D. Hall.
ATTORNEY

FIG. 3.

INVENTOR.
ROLLIN W. KING
EMMANUEL BERLANT
BY
ATTORNEY

FIG. 4.

INVENTOR.
ROLLIN W. KING
EMMANUEL BERLANT
BY
William D Hall
ATTORNEY

*INVENTOR.*
ROLLIN W. KING
BY EMMANUEL BERLANT

ATTORNEY

May 1, 1951  R. W. KING ET AL  2,550,698
AUTOMATIC REFLEX CAMERA WITH DIAPHRAGM ADJUSTMENT
AND FLASH SYNCHRONIZER MEANS
Filed Sept. 12, 1945  6 Sheets-Sheet 5

INVENTOR.
ROLLIN W. KING
EMMANUEL BERLANT
BY
William D. Hall
ATTORNEY

Patented May 1, 1951

2,550,698

UNITED STATES PATENT OFFICE 2,550,698

AUTOMATIC REFLEX CAMERA WITH DIAPHRAGM ADJUSTMENT AND FLASH SYNCHRONIZER MEANS

Rollin W. King and Emmanuel Berlant, Jackson Heights, N. Y., assignors, by mesne assignments, to Graflex, Inc., Rochester, N. Y., a corporation of Delaware Application September 12, 1945, Serial No. 615,906

40 Claims. (Cl. 95—42)

(Granted under the act of March 3, 1883, as amended April 30, 1928; 370 O. G. 757)

The invention described herein may be manufactured and used by or for the Government for governmental purposes, without the payment to us of any royalty thereon.

The present invention relates to cameras and more particularly to cameras in which but a single adjustment is necessary before the taking of a photograph.

Most cameras are relatively slow in operation and are subject to poor results because of errors in making the necessary and sometimes critical adjustments, and also it is ordinarily requisite, for good results, that they be operated by fairly experienced photographers. Various means, such as light meters, self-incorporated coupled range finders, and the like, which aid in reducing errors and in speeding up the process, have been introduced to the photographic art, but so far as is known to applicants, there is no camera suitable for general use which requires but a single adjustment (other than moving the film to the next frame) and in which the results are invariably good, even in the hands of a neophyte in the art of photography. The present invention, however, provides a camera which does just that. The several factors, which are ordinarily variables, are made constant or are predetermined and made automatic, so that the only adjustment is the relatively simple one of focusing, preferably as in a reflex camera.

It is, therefore, an object of the present invention to provide a camera wherein the only adjustment that need be made is focusing.

It is a further object to provide such a camera which incorporates its own light source.

It is another object to provide means which allow the focusing of a camera with its diaphragm wide open, so as to obtain brightest illumination and shallowest depth of focus, but which automatically determine the correct diaphragm stop for taking a particular picture and then close the diaphragm to said stop upon the triggering of the camera.

It is a further object to provide a light source in the form of a compact circular tube disposed concentrically with the lens of a camera.

It is another object of the present invention to eliminate the necessity for ever holding the camera sideways, by providing a rotating back, which will allow the use of roll film, either horizontally or vertically, or even obliquely if desired, without interfering with the film transport mechanism.

It is still a further object to provide shutter means, for a reflex type camera, which means are associated with the reflex mirror, whereby closing of the shutter may be effected more rapidly than could be accomplished by using the mirror itself as a shutter.

Generally, the present invention comprises a still camera, preferably of the reflex type, which incorporates its own light source, preferably in the form of a small circular gaseous tube disposed concentrically with the camera lens, which provides a light of great intensity but very short duration; a shutter means, which opens before, and closes after, the flash of the said light source, and which is preferably in the form of a shutter plate, which pivots about the same axis as the reflex mirror, but which returns to its closed position, separately from the mirror, immediately after the light flash; a focusing and diaphragm setting mechanism whereby the operation of focusing the camera, which is accomplished with the diaphragm wide open, also automatically effects the positioning of a cam so that, upon triggering the camera for taking a picture, a cam follower cooperates with said cam to allow the diaphragm to be automatically closed down to the correct stop; and a rotating back, which houses roll film, which back may be rotated so that pictures may be taken vertically or horizontally, the back being so arranged that the film may be transported to the next frame at any operating position of the said rotating back.

In the embodiment hereinafter described, it will be seen that, as the light source produces a flash of great brilliance and very short duration and as the intensity and duration thereof are constant, the only adjustments which need be made are focusing for the distance between the camera and the subject and adjusting the diaphragm opening to such distance. Adjustment of the diaphragm is necessary as the amount of light reaching the subject from the light source, which is located at the camera, will likewise depend upon the distance between the camera and the subject. As, under the circumstances, the proper relationship between focus and diaphragm opening may be predetermined, the diaphragm adjustment may be automatically effected concomitantly with the focusing operation, by the use of a suitably shaped cam and cam follower. However, in order to facilitate focusing, although the said cam is positioned simultaneously with focusing, the diaphragm itself is left wide open (to provide a maximum amount of light and a minimum depth of focus) until the camera is triggered for the taking of a picture. At that time, the diaphragm closes down until the cam follower, which is geared to it, makes contact with the cam, which has already been suitably positioned during focusing, whereupon the flash occurs and the film is exposed. Thus, in order to take a picture, focusing is the only adjustment that need be made.

Although, in the illustration hereinafter described, the present invention is applied to a particular type of camera, it will be understood that the invention, or certain features of it, may be applied to other types of photographic equipment, as will be apparent to persons familiar with the photographic art.

For a better understanding of the invention, together with other and further objects thereof, reference is had to the following description taken in connection with the accompanying drawings, wherein like parts are indicated by like reference numerals, and its scope will be pointed out in the appended claims.

In the accompanying drawings.

Figure 11 is a schematic wiring diagram of the flash unit.

Figures 1, 2, 7:
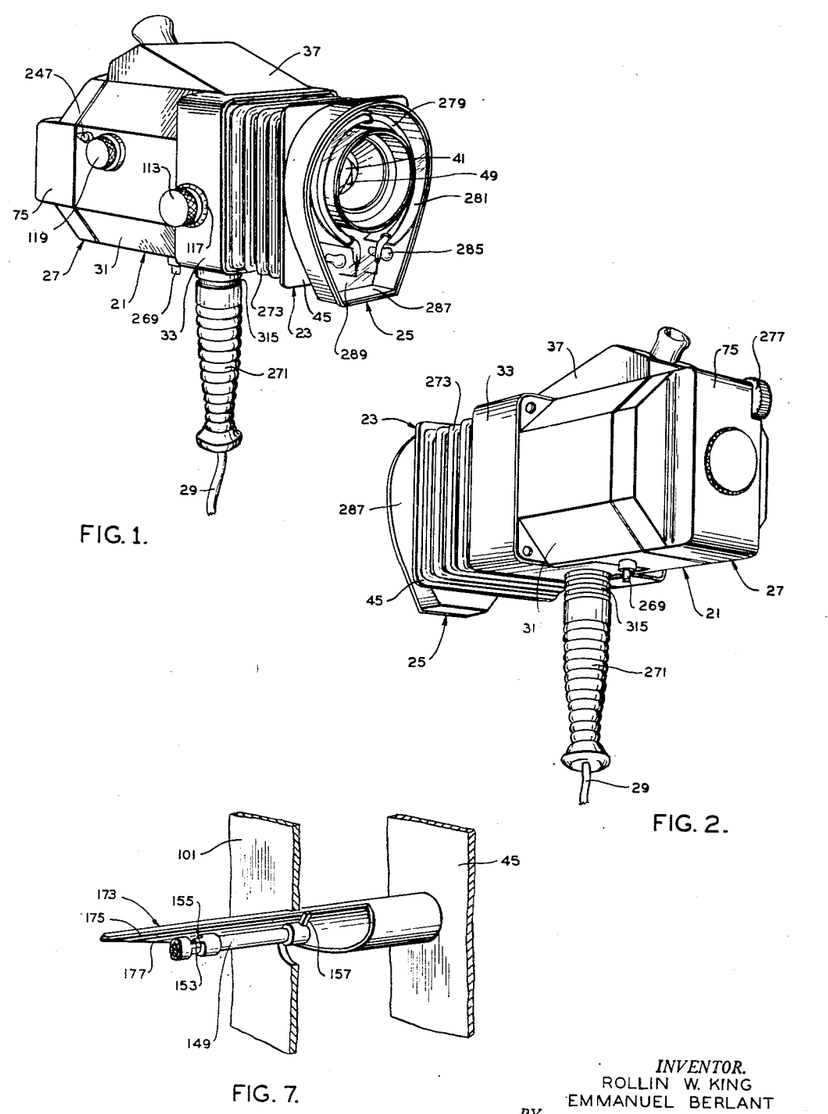
Figure 1 is a front perspective view of a camera embodying the present invention, the bellows being shown extended about half way.
Figure 2 is a rear perspective view of the camera of Figure 1.
Figure 7 is a fragmentary perspective view of the cam, cam follower and associated parts of said camera.
Figure 2:
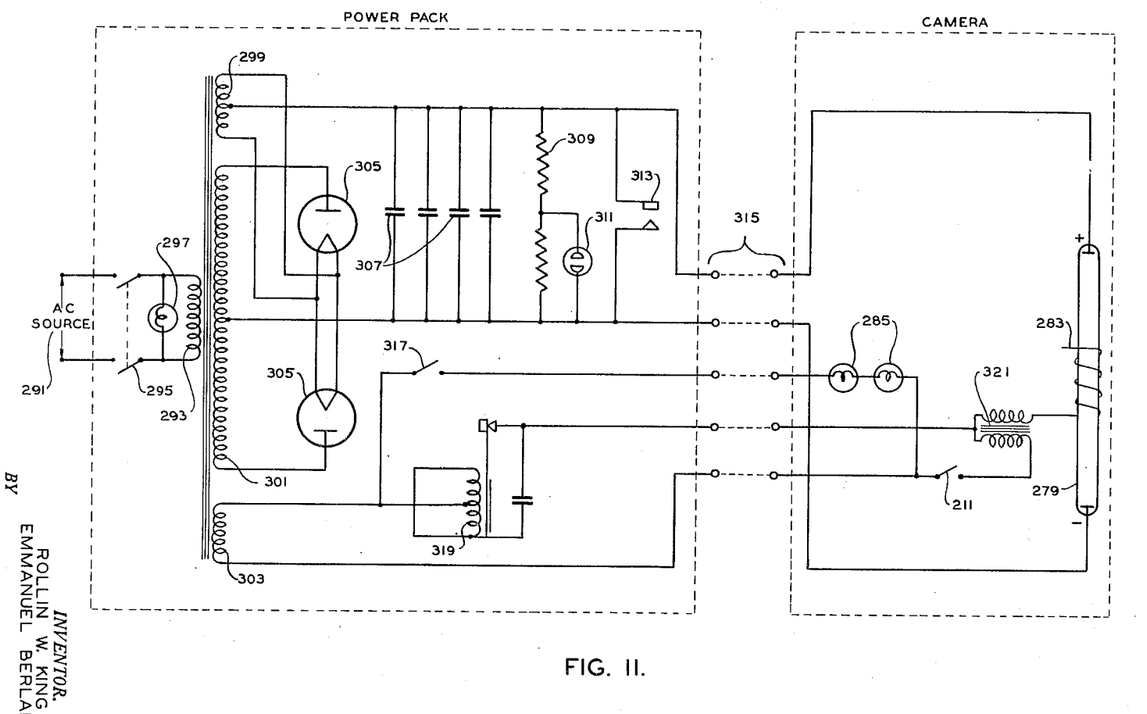
Figure 3:
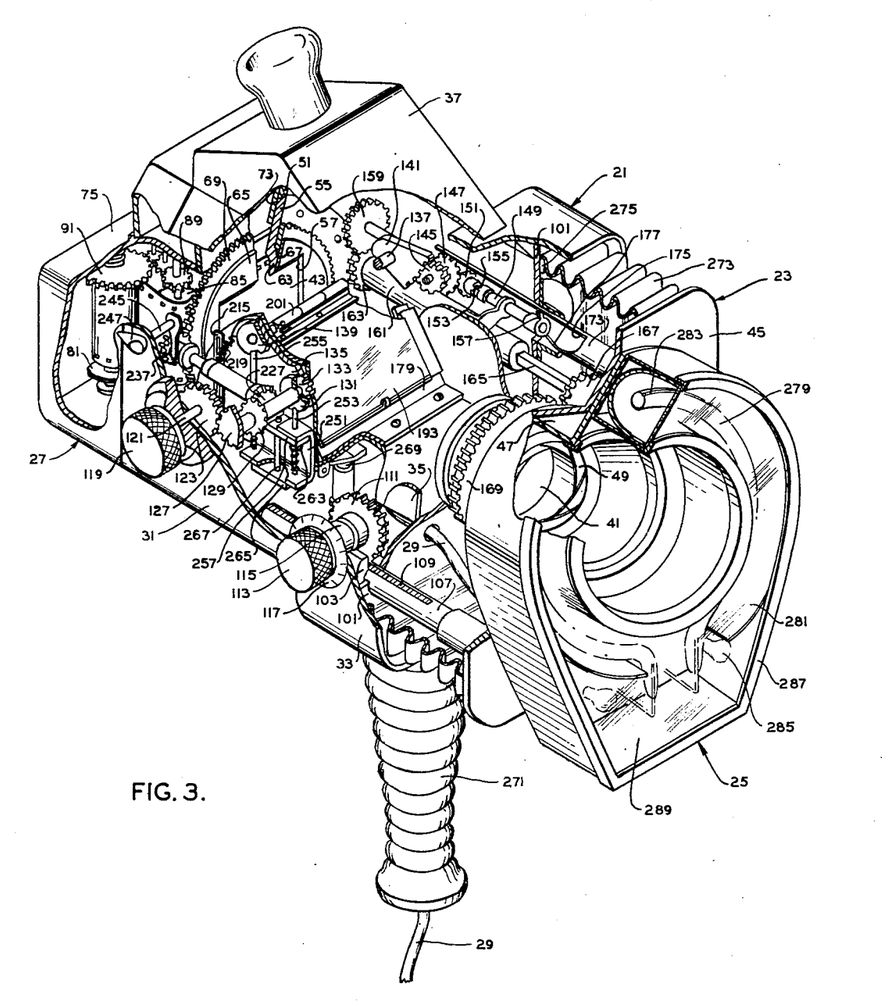
Figure 3 is an enlarged perspective view, similar to Figure 1, parts of the camera being shown broken away to expose the interior, the parts being illustrated in their relative positions during the focusing of the camera.

Referring now to the drawings, and more particularly to Figures 1, 2 and 3 thereof, the camera illustrated includes as its main structural components a body assembly 21, a lens assembly 23 which is positioned at the forward end of said body assembly 21 and is longitudinally movable relative thereto, a flash unit 25 which is rigidly secured to the front of the lens assembly 23 and moves with it, and a rotating back 27 which is positioned at the rear end of the body assembly 21 and is rotatable with respect thereto. The camera is used with a power pack (not shown), which is connected to the camera by means of a multiple conductor electrical cable 29, which power pack incorporates the elements indicated in Figure 11.

The body assembly 21 includes a camera body 31, which is octagonal, in vertical cross section, and a camera frame 33 which is of substantially square configuration, which is rigidly secured thereto, and an inner housing 35 which is square in vertical cross section and is coaxially disposed within, and spaced from, said camera body 31 and camera frame 33. The top of the camera body 31 is provided with a viewer housing 37.

As will appear hereinafter, said inner housing 35 encloses a photographic chamber 39, which is provided with a lens 41 at one end and a photographic film 43 at the other, and the various mechanisms for operating the camera are positioned largely in the space between said inner housing 35 and said body 31 and frame 33.

The lens assembly 23 comprises a flat lens board 45, of substantially square outer configuration, which is provided with a central circular opening in which is secured a rearwardly directed funnel-like lens ring 47 which supports the lens 41 provided with a conventional, iris type, diaphragm 49.

The rear end of the camera body 31 terminates in a vertically disposed rear wall 51 which is provided with a large circular aperture, the inner marginal edge of which forms a bearing surface 53. Rotatably positioned within said bearing surface 53 is an aperture plate 55 which is pierced centrally by an oblong frame opening 57. In order to retain said aperture plate 55 properly positioned in the bearing surface 53, said bearing surface is provided with an inwardly projecting annular flange 59, and the outer periphery of the aperture plate 55 with an outwardly extending annular flange 61, the flange 61 being positioned forward of the flange 59.

Said aperture plate 55 is also provided with a forwardly extending annular bearing flange 63, to which is secured a washer-like plate 65, the outer periphery of which is of greater diameter than the outer periphery of the bearing flange 63 so that there is formed, between the aperture plate 55 and the washer-like plate 65, a bearing channel 67 which encircles said flange 63. Positioned in said bearing channel 67 is a freely rotatable ring gear 69, which is merely a flat metal ring provided with spur gear teeth about its outer periphery. The aperture plate 55 aforesaid is also pierced near its outer periphery by two small indexing holes 71, which are positioned in quadrature.

Secured to the aperture plate 55 and positioned directly behind the rear wall 51 of the camera body 31, is the rotating back 27 which includes a centrally apertured rotation plate 73 and a film housing 75 hingeably secured, at one edge, to the rotation plate 73, and provided with a catch 77 at the opposite edge. When closed, the rotation plate 73 and film housing 75 form a lightproof unit provided with two mutually parallel, cavities receivable to a film cartridge 79 and a take-up spool 81.

Secured within the film housing 75 is a vertically disposed C-shaped pressure plate 83. Rotatably positioned behind the right end of the pressure plate 83, and parallel to the take-up spool 81, is a sprocket spool 85. Secured to one end of the sprocket spool 85 is a sprocket drive bevel gear 87 and to the other end thereof is a sprocket spool spur gear 89. Said spur gear 89 is geared, through a pair of spur gears, to a take-up spur gear 91 which is coupled to the take-up spool 81 through a friction plate 93, to avoid undue strain on the film 43.

The sprocket drive bevel gear 87, just mentioned, is in mesh with a sprocket driver bevel gear 95 secured to the rear end of a short, horizontally disposed, shaft 97, which extends forward through a bearing in the aperture plate 55.

mentioned above, and terminates in a small sprocket driver spur gear 99 which is in mesh with the ring gear 69, aforementioned.

Secured within the camera frame 33 is a vertically disposed front wall 101 and, immediately behind it, two bearings 103 which slidably support a horizontally disposed guide shaft 105 and a horizontally disposed drive shaft 107, the forward ends of which shafts 105, 107 are rigidly secured to the lens board 45, thereby allowing the lens assembly 23 to move longitudinally relative to the body assembly 21.

The upper surface of the drive shaft 107 is provided with a countersunk rack 109 (see particularly Figure 3). A focusing pinion 111, in mesh with said rack 109, is rotatable by means of a focusing knob 113, positioned outside the camera on the right side of the camera frame 33. Said focusing pinion 111 and focusing knob 113 are preferably coupled through a friction clutch 115, so that undue pressure may not be transmitted to said pinion 111 (and ultimately to the cam and cam follower, as will hereinafter appear). Rigidly secured to said focusing pinion 111, and positioned outside the camera, concentric with the focusing knob 113, is a circular distance scale 117.

Positioned on the right side of the camera body 31, to the rear of the focusing knob 113, is a reset knob 119. Said reset knob 119 is made fast to the outer end of a reset shaft 121 which extends through the camera body 31 and terminates in a reset spur gear 123. Disposed in suitable bearings, a short distance forward of reset shaft 121 is a power transmitting shaft 125, to which are rigidly secured a power transmitting spur gear 127 (in mesh with the aforementioned reset gear 123, and having one gear tooth less than said gear 123), a film drive bevel gear 129, a film advance locking cam 131 (which is a vertically disposed disk provided with an indentation at one point of its periphery), and a shutter setting spur gear 133 (which is toothless throughout a small portion of its periphery). A conventional type one-way brake 134 encircles said shaft 125. Said brake may comprise a spring (not shown) wound snugly about said shaft 125 and anchored at one end and a sleeve surrounding said spring.

Said shutter setting gear 133 is meshable with a mirror actuating gear segment 135, which is rigidly fastened to a mirror-shutter shaft 137 which extends horizontally completely through both side walls of the inner housing 35. Rigidly secured to the right end of said mirror-shutter shaft 137 is a mirror holding cam 139, which is a vertically disposed disk provided with an indentation at one portion of its periphery, said indentation, however, being wider than the indentation in the cam 131, aforementioned.

A diaphragm opening spur gear segment 141 is rigidly secured to the left end of said mirror-shutter shaft 137, extending beyond the left wall of the inner housing 35. A short distance forward of the mirror-shutter shaft 137, parallel thereto, and positioned to the left of the inner housing 35, is a short, suitably sustained, non-rotatable intermediate shaft 143, which is provided with an idler spur gear 145 and an idler bevel gear 147. Said gears 145, 147 are freely rotatable as a unit upon the said shaft 143, and the said spur gear 145 is in mesh with the gear segment 141, aforementioned.

To the left of the inner housing 31 is a longitudinally positioned, diaphragm control shaft 149, which is rotatably supported in suitable bearings, and is provided with a diaphragm opening bevel gear 151, which is in mesh with the bevel gear 147 aforesaid and is freely rotatable upon said shaft 149. Said bevel gear 151 has secured to it a longitudinally extending, diaphragm opening finger 153. The shaft 151 is also provided with a longitudinally disposed finger 155, which cooperates with the said finger 153. Rigidly fastened to the forward end of the diaphragm control shaft 149 is a cam follower 157, which is a radially disposed dog. A cam follower spur gear 159 is fastened to the shaft 149 near its rear end.

Figure 6:
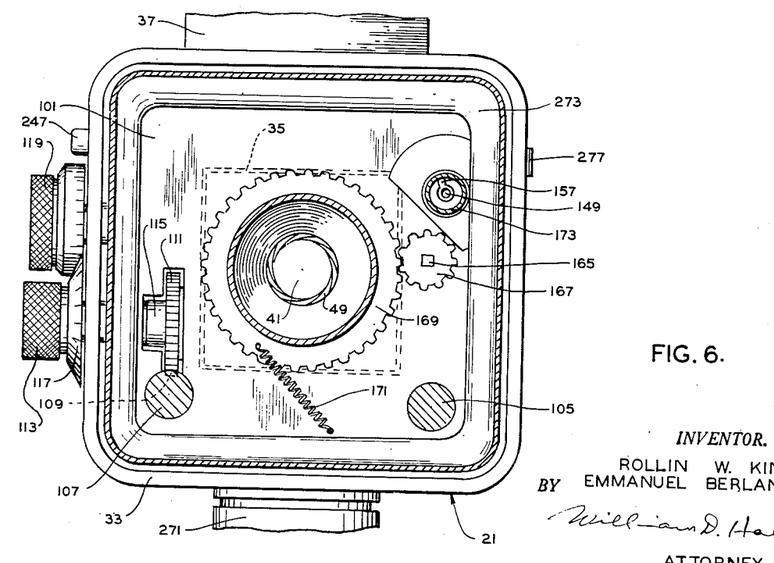
Figure 6 is a vertical sectional view, taken along the line 6—6 of Figure 5.

Below the shaft 149, and parallel to it, is a rotatable circular sleeve 161 provided with a longitudinal bore of square configuration. A spur gear 163, in mesh with the spur gear 159 mentioned above, is made fast to the rear end of said sleeve 161. Longitudinally slidably positioned in the bore of said sleeve 161 is a square rod 165 upon which is mounted a spur gear 167 which is in mesh with a diaphragm spur gear 169 which is secured to, and concentric with, the conventional iris diaphragm 49. The said diaphragm spur gear 169 is continuously urged in a counter-clockwise direction (when viewed from the front of the camera) by the helical diaphragm spring 171 (see Figure 6), thereby urging the diaphragm 49 toward its smallest opening.

A cam 173 (see particularly Figures 3 and 7) is rigidly secured to the lens board 45 and extends backward longitudinally therefrom, the front wall 101 being provided with a circular aperture through which said cam 173 is free to slide. The cam 173 is preferably cut from a metal tube, and it is provided with a longitudinally disposed straight edge 175 and with a curved cam surface 177 which extends about the cam in a generally helical manner, its exact contour being dependent upon the characteristics of the particular lens 41 and diaphragm 49 being used.

Figure 4:
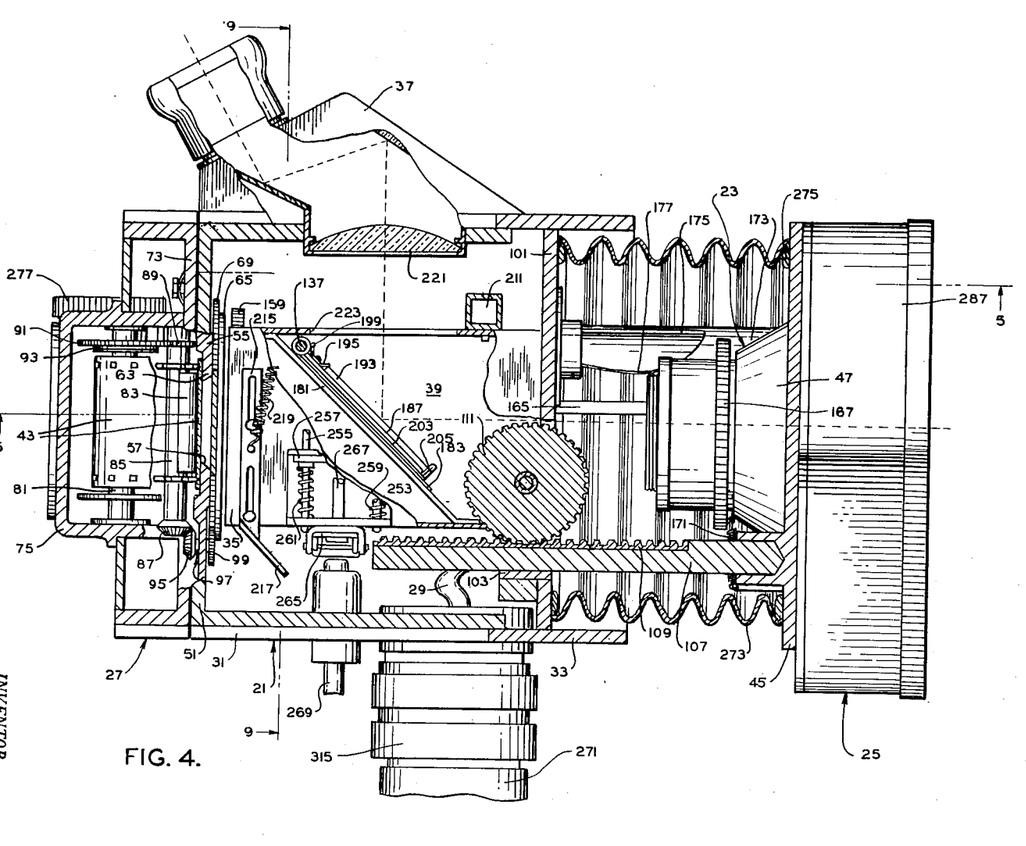
Figure 4 is a longitudinal vertical sectional view, taken along the line 4—4 of Figure 5.
Figure 5:
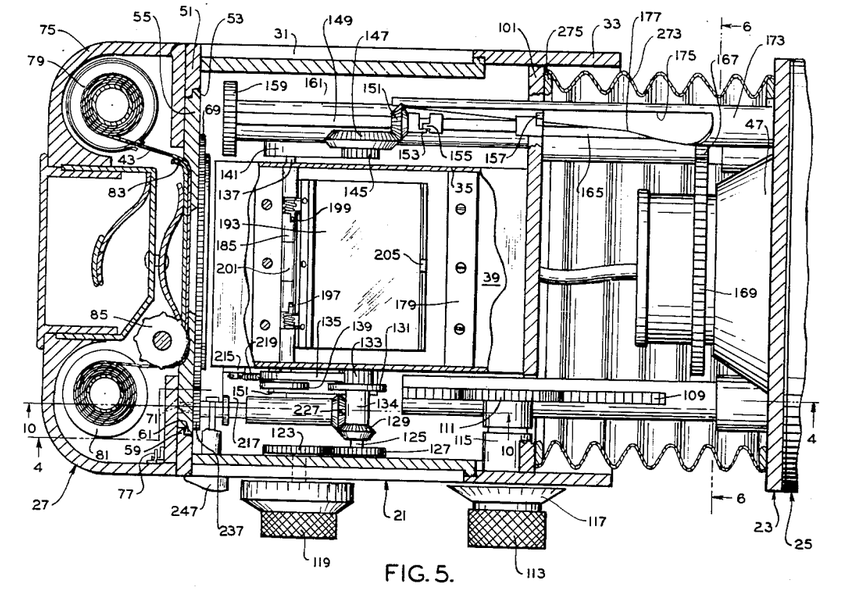
Figure 5 is a horizontal sectional view, taken along the line 5—5 of Figure 4.
Figure 8:
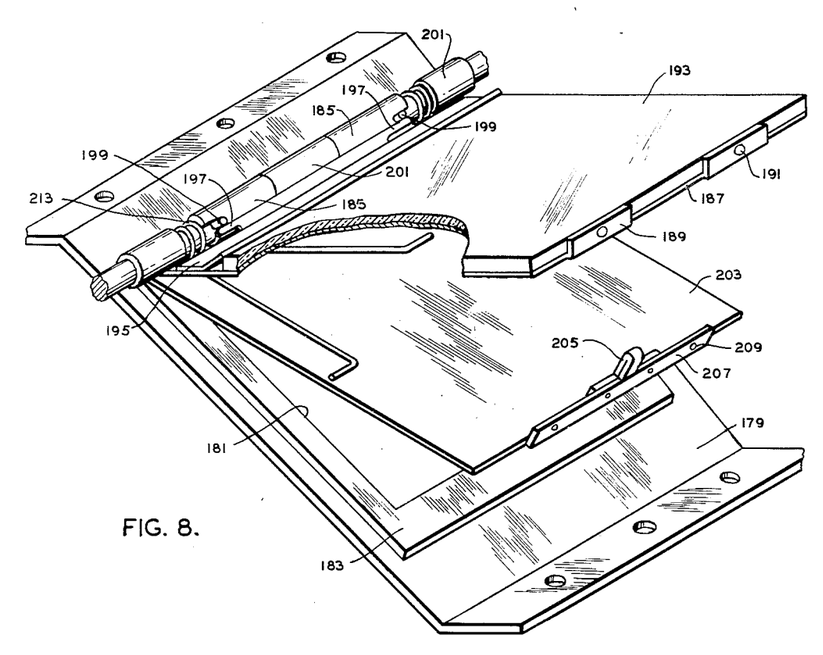
Figure 8 is a perspective view, partly broken away, of the mirror and shutter assembly of the camera, in the relative positions taken by them just after the light source has flashed and as the shutter plate is moving downward toward its closed position.

As stated above, the mirror-shutter shaft 137 extends completely across the photographic chamber 39, near the top of said chamber (see particularly Figures 4 and 5). Immediately below said shaft, is a baffle plate 179 which extends downward, toward the front of the camera, at a forty-five degree incline. Said baffle plate 179 makes a lightproof fit with the interior of the inner housing 35 and is provided with a large central rectangular opening 181 (see particularly Figure 8). The upper surface of said baffle plate 179, about said opening 181, is covered with a frame-like shutter gasket 183 of felt or similar resilient material.

Hingeably attached to the mirror-shutter shaft 137, by means of two mirror plate hinge sleeves 185, is a flat rectangular metal mirror plate 187 which is provided at its distal end with a pair of upwardly extending detent flanges 189, each of which is pierced by a small detent aperture 191. A mirror 193 is fastened to the upper surface of said mirror plate 187. A spring plate 195, fitted with two spring fingers 197, parallel to the mirror-shutter shaft 137, is secured to the proximal end of said mirror plate. The said shaft 137 is fitted with two radially disposed pins 199 which extend outwardly through openings in the mirror plate sleeves 185 just above the said spring fingers 197, so that the mirror plate 187 will rotate with the shaft in both directions of rotation, but if the mirror plate is held against rotation the said shaft may be rotated slightly in one direction as the pins 199 may spring the spring fingers 197 down slightly.

Positioned below the mirror plate 187, and also pivotally secured to the mirror-shutter shaft 137, by means of three shutter plate hinge sleeves 201, is a flat metal shutter plate 203 which is provided, at its distal extremity, with an upwardly extending contact arm 205 and an upwardly extending detent flange 207, provided with two detents 209 adapted to cooperate with the detent apertures 191 mentioned above. The said shutter plate 203, when in its downward position (as shown in Figures 3 and 4), makes a light tight fit against the shutter gasket 183 of resilient material mentioned above and when in its upward position, the contact arm 205 closes an electrical switch 211 (Figure 4). Said switch 211 (which may be any suitable electrical single pole, single throw switch) is secured to the top wall of the inner housing 35 and will be referred to hereinafter in connection with the flash unit 25. When both the mirror and shutter plates 187, 203 are in their upward positions, their distal extremities are spaced sufficiently so that the detents 209 and detent apertures 191 are disengaged. A pair of helical shutter springs 213 are wound about the mirror-shutter shaft 137, their ends extending between the mirror plate 187 and shutter plate 203, and they are adapted to urge said plates apart.

A tension adjusting plate 215 (see Figure 4), provided with vertically disposed slots, is fastened to the right wall of the inner housing 35 so as to be free to slide vertically. An obliquely disposed shoe 217 is attached to the lower end of said plate 215. A helical, mirror return spring 219 connects said plate 215 and the mirror actuating gear segment 135. The said shoe 217 is so positioned, directly behind the drive shaft 107, that, when the said shaft is moved backward, its rear end engages said shoe and causes the plate 215 to slide downwardly, thereby increasing the tension upon the mirror return spring 219, as will be made clearer hereinafter.

The viewer housing 37, already referred to, extends upward from the camera body 31. It houses a suitable viewer optical system, preferably of the magnifying type, including a ground glass 221. The upper wall of the inner housing 35 is provided with a rectangular aperture 223 immediately below said ground glass 221.

Figure 10:
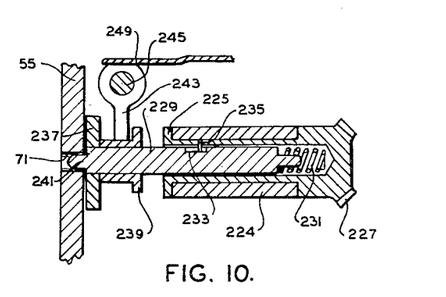
Figure 10 is a fragmentary cross sectional view, taken along the line 10—10 of Figure 5, showing details of the release mechanism for the rotating back.

Positioned in a suitable bearing 224, to the right of the inner housing 35, is a freely rotatable hollow sleeve 225 (see particularly Figures 10 and 3), provided at its forward end with a film transport bevel gear 227, which is in mesh with the film drive bevel gear 129 already described. A retractable shaft 229 is positioned in the hollow sleeve 225 aforesaid and is urged toward the back of the camera by a helical spring 231 disposed within said sleeve. Said shaft 229 is provided with a longitudinally disposed slot 233 into which extends a pin 235 which is rigidly secured to the inside of said sleeve 225, so that said shaft and sleeve rotate as a unit, but the shaft may be slid forward longitudinally a limited distance against the pressure of the spring 231.

Secured to the rear end of the retractable shaft 229 is a film transport spur gear 237, in mesh with the ring gear 69 already described. Also secured to said shaft 229, and spaced from said spur gear 237, is a radially disposed flange 239. Extending backward beyond said spur gear 237, and concentric therewith is a short pin 241 adapted to extend into either one of the indexing holes 71, previously referred to, in the aperture plate 55.

Extending downward, intermediate the spur gear 237 and the flange 239, is a retracting arm 243 which is rigidly fastened to the inner end of a short retracting bar 245 which extends through a bearing set into the right wall of the camera body 31. Said bar 245 terminates outside said camera body 31 in a retracting knob 247. The upper surface of the retracting arm 243 is flat and a leaf spring 249 presses against said flat surface so that, during normal operation, said retracting arm does not interfere with the operation of the film transport mechanism. However, upon rotating the retracting knob counterclockwise, the arm 243 presses against the flange 239 and thereby disengages the spur gear 237 from the ring gear 69. Upon release of said retracting knob, the spring 231 causes re-engagement thereof.

A U-shaped yoke 251 is fastened to the right wall of the inner housing 35 immediately below the cams 131 and 139. Extending vertically through both arms of the said yoke 251 are a film advance locking pin 253 (adapted to cooperate with the film advance locking cam 131) and a mirror holding pin 255 (adapted to cooperate with the mirror holding cam 139). Said pins 253, 255 also pass through holes in a trigger plate 257 which is horizontally disposed immediately below the upper arm of the yoke 251. Interposed between the lower arm of the yoke 251 and the said trigger plate 257 and encircling the two pins 253, 255, respectively, are helical springs 259, 261. The mirror holding pin 255 is rigidly fastened to the trigger plate 257 so that the two members move as a unit. A flange 263 is rigidly secured to the film advance locking pin 255, immediately below the trigger plate 257, which serves to hold the cock pin 253 out of engagement with the indentation in the cam 131 until the mirror is again reset by turning the knob 119 and the pin 255 engages the indentation in the cam 239, allowing the plate 257 to move in an upward direction because of the springs 259, 261. This will allow the lock pin 253 to engage the indentation in the cam 131, thus preventing further turning of the knob 119.

Figure 9:
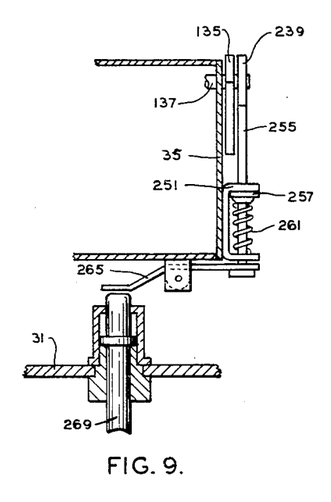
Figure 9 is a fragmentary, vertical sectional view, taken along the line 9—9 of Figure 4, showing details of the trigger mechanism.

Pivotably secured to the bottom of the inner housing 35 is a trigger lever 265 (Figure 9), the right end (as viewed from the rear of the camera) of which is normally positioned immediately below the yoke 251 aforesaid and is coupled to the trigger plate 257 by a pull down rod 267 which extends through a hole in the lower arm of the said yoke 251. The left end of the trigger lever 265 is normally below, and spaced from, the bottom of the inner housing 35. Immediately below said left end, and extending through a hole in the bottom of the camera body 31, is a trigger 269 which is vertically slidable, but is normally maintained in a downward position by gravity or by a trigger spring (not shown).

Extending downwardly from the bottom of the body assembly 21 is a camera handle 271, which is positioned immediately forward of the trigger 269 so that an operator can conveniently hold the camera in his left hand, by means of said handle, and press the trigger upwardly with his thumb. The multiple conductor electrical cable 29, which connects the flash unit 25 with a power pack (not shown), extends through said handle 271.

A bellows 273, of leather or the like, is secured to the front plate 101 and the lens board 45 by means of bellows frames 275. The rotating back 27 is provided with a conventionally operating rewind knob 277 to return the film 43 to the film cartridge 79 after a roll has been exposed.

The flash unit 25, which is rigidly secured to the lens board 45, aforementioned, includes a gaseous type, elongated flash tube 279, which is bent into as small a circle as possible, concentric with the camera lens 41. Said tube 279 is suitably sustained in front of a circular reflector 281. Secured along the outside of the tube 279 is an ionizing electrode 283. Below the reflector 281 are a pair of small focusing bulbs 285, of the flashlight type. Said tube 279 and bulbs 285 are housed in a suitable flash case 287, having a transparent front wall 289 and provided with a circular central opening directly in front of the lens 41.

The electrical system is shown in Figure 11, the components located within the camera, and those within a power pack, respectively, being so marked. The circuit includes an A.-C. source 291 which is connected, through a suitable double-pole, single-throw, line switch 295, across the primary 293 of a transformer and across a pilot light 297. Said transformer is provided with three secondaries 299, 301 and 303, the secondary 299 producing a suitable low voltage for heating the filaments of a pair of rectifier diodes 305, and the end terminals of the secondary 301, which produces a relatively high potential, being connected respectively to the plates of said diodes.

Center taps on the said secondaries 299, 301 are connected across a bank of large capacitors 307 (arranged in parallel), across a bleeder resistor 309, across a safety switch 313 (which is normally held open, but which prevents injury by closing when the power pack is tampered with) and ultimately to the electrodes of the flash tube 279, by way of the multiple conductor cable 29 and a separable, multiple conductor connector 315 which is located at the upper end of the camera handle 271. The resistor 309 is tapped to form a voltage divider, so as to supply a predetermined minimum voltage to a neon lamp 311 when the potential across the capacitor bank has reached a predetermined requisite minimum value.

The third secondary 303, which itself produces a relatively low voltage, is caused to supply a very high potential, rapidly alternating current to the ionizing electrode 283 through an interrupter 319 (which may be a simple buzzer) and an auto-transformer 321, the triggering switch 211, aforementioned, which is normally open, being in series with the primary of said auto-transformer, and the ionizing electrode 283 being connected to the high potential terminal of the secondary thereof. The focusing bulbs 285 and a focusing switch 317 are also connected, in series, directly across said secondary 303.

The operation of the camera just described is as follows: To load, the film housing 75 may be swung back about its hinge, upon release of the catch 77, and a film cartridge 79 is positioned in the cavity provided for it, the film 43 being then first threaded between the pressure plate 83 and the aperture plate 55, then about the sprocket wheel 85 and finally onto the take-up spool 81. The film housing 75 is then closed and the reset knob 119 is rotated and the trigger 269 actuated several times to move unexposed film into position. To take a photograph, the line switch 295 is closed, and the reset knob 119 is rotated in a clockwise direction until it locks. Focusing is then accomplished by the focusing knob 113 whereupon the picture may be taken by viewing the subject through the viewer and pressing the trigger 269 upward with the thumb.

More specifically, said operative steps are effectuated as follows: After the camera has been triggered, the mirror plate 187 and the mirror 193 are left in their upward positions, against the top wall of the inner housing 35 and the shutter plate 203 is left in its downward position against the shutter gasket 183. When the reset knob 119 is rotated in a clockwise direction, it rotates the spur gear 123, which in turn rotates the spur gear 127, the shaft 125, the bevel gear 129, the cam 131 and the gear 133. As said gear 133 first starts to rotate, it is out of mesh with gear segment 135 as the toothless portion of its periphery is facing said gear segment. However, as soon as it rotates a bit, it engages the said gear segment 135 and rotates it, which in turn rotates the mirror-shutter shaft 137, the cam 139 and the gear segment 141, and swings the mirror plate 187 and the mirror 193 downward.

When the mirror plate 187 is brought down until it is contiguous with the shutter plate 203, the detents 209 engage with the detent apertures 191, and the cam 139 reaches the position shown in Figure 3, so that the upper end of the mirror holding pin 255 is urged upwardly into the indentation in said cam by the spring 261. At this instant, the indentation in the cam 131 has not yet reached the bottom of said cam so as to receive the film advance locking pin 253.

With further slight rotation of the reset knob 119, the cam 139 continues to turn and the pin 255 rides in the relatively wide indentation in said cam. This additional slight rotation of the mirror-shutter shaft 137 may take place, despite the fact that the mirror plate 187 is already in its lowest position, by virtue of the fact that the fingers 197 have sufficient resiliency to allow the mirror-shutter shaft 137 to turn slightly relative to the sleeves 185, the pins 199 deflecting said fingers 197 downwardly.

At this point, the indentation on cam 131 reaches the position at the bottom of said cam, whereupon the film advance locking pin 253 is urged upwardly into said indentation by the spring 259. At the same time, the spur gear 133 rotates to the point where its toothless periphery is presented to the gear segment 135. Said gear segment 135 is then free to rotate in a counter-clockwise direction under the urge of the mirror return spring 219, until the cam 139 is again in the position shown in Figure 3, whereupon the pin 255 prevents further rotation of said cam in said direction and the pressure of the pins 199 downward upon the resilient fingers 197 has been partially relieved. This locking of the cam 139 likewise locks the mirror-shutter shaft 137, and the mirror plate 187 and the mirror 193, attached to it, against counterclockwise rotation.

The reset knob 119 cannot now be turned further in a clockwise direction as the film advance locking pin 253 is in the indentation in cam 131 and has locked further rotation thereof. The reset knob 119 can, at no time, be rotated in a counterclockwise direction because of the one way brake mechanism 134. As gear 123 has one more gear tooth than gear 127, the dial under reset knob 119 may indicate the number of frames which have been exposed at any time.

During the rotation of the reset knob 119, in a clockwise direction, as already described, several other things are accomplished simultaneously. Rotation of the diaphragm opening gear segment 141 causes rotation of the idler spur gear 145 and the idler bevel gear 147 which, in turn, causes a clockwise rotation (when viewed from the front of the camera) of the diaphragm opening bevel gear 151 and of the finger 153. Such clockwise rotation of the finger 153 carries the finger 155 with it, in a clockwise direction. As said finger 155 is rigidly secured to the diaphragm control shaft 149, the cam follower 157 is likewise caused to rotate in a clockwise direction until it takes a position just short of making contact with the straight edge 175 of the cam 173 (as shown in Figures 3, 5 and 7).

Such clockwise rotation (as viewed from the front) of the finger 155 and the diaphragm control shaft 149 also causes clockwise rotation of the cam follower spur gear 159 and, therefore, counterclockwise rotation of the spur gear 163, the sleeve 161, the square rod 165 and the spur gear 167 which, in turn, causes clockwise rotation of the diaphragm spur gear 169, thereby opening the diaphragm 49 to its largest opening, and extending the diaphragm spring 171.

As already stated, rotation of the reset knob 119 causes counterclockwise rotation of the film drive bevel gear 129. This results in rotation of film transport bevel gear 227 and film transport spur gear 237, which, in turn, rotates gear 69. As said ring gear 69 is also in mesh with the sprocket drive spur gear 99, said latter gear is thereby rotated, and, along with it, the sprocket driver bevel gear 95 and sprocket drive bevel gear 87, which is in mesh with it. Thus, the sprocket spool 85 and the sprocket spool spur gear 89, attached to its upper end, are caused to rotate which, in turn, through two intermediate spur gears, causes rotation of take-up spur gear 91 on the take-up spool. Thus, the film 43 is transported to the next frame by means of the sprocket spool 85 and is taken up on the take-up spool 81, strain on the film 43 being avoided, however, by the friction plate 93, already described.

The camera is now ready for focusing. This is done while the operator is looking down at the ground glass 221. The lens 41 is moved longitudinally by rotating the focusing knob 113 which, through the friction clutch 115, rotates the focusing pinion 111, which moves the rack 109 and drive shaft 107 longitudinally and thereby similarly moves the lens board 45 and the lens 41 until the sharpest image is seen in the ground glass 221. The lens is then positioned properly relative to the distance between the camera and the subject.

During such focusing, the cam 173, which is rigidly secured to the lens board 45, is also moved longitudinally so that, when focusing is completed, the said cam 173 is in a particular longitudinal position relative to the cam follower 157, although the latter is not then in engagement with said cam. Also, during the focusing operation, the square rod 165 is moved longitudinally in the sleeve 161.

Upon completion of the focusing, the camera is in condition to take a picture. The operator then presses upwardly on the trigger 269, while using the ground glass 221 as a viewer finder. Such upward movement of the trigger 269 raises the left end (as viewed from the rear of the camera—see Figure 9) of the trigger lever 265 and depresses the right end thereof. This lowers the pull down rod 267 and the trigger plate 257. The mirror holding pin 255, being integral with the said trigger plate 257 is, therefore, pulled downward simultaneously, and the film advance locking pin 253 is likewise simultaneously pulled downward as said trigger plate pulls the flange 263 and said pin 253 downward along with it. As soon as said pins 253, 255 have been lowered, the cams 131 and 139 are no longer prevented from rotation thereby. As the toothless portion of shutter setting spur gear 133 is presented to the mirror actuating gear segment 135, the latter is also free to rotate.

The tension of the mirror return spring 219, therefore, causes an immediate and rapid counterclockwise rotation of said gear segment 135, and the mirror-shutter shaft 137, thereby immediately raising the mirror plate 187 and mirror 193. The shutter plate 203 also immediately swings upwardly because of the engagement between the detents 209 and the detent apertures 191. Thus, the mirror plate 187, mirror 193 and shutter plate 203 swing upwardly as a unit, until the contact arm 205 engages the electrical trigger switch 211. As the contact arm 205 is attached to the shutter plate 203, the latter is stopped suddenly, whereas the mirror plate 187 and mirror 193, having considerable inertia, continue upwardly a short additional distance until they reach their upward positions. This is sufficient, however, to cause disengagement of the detents 209 and detent apertures 191, aforesaid, and, therefore, separation of the mirror plate 187 from the shutter plate 203, whereupon the shutter plate 203 is immediately snapped downwardly by the shutter springs 213 until it impinges against the shutter gasket 183. The various parts are preferably so arranged that the film 43 has been exposed through the opening in the baffle plate 179 for a period of the order of a hundredth of a second.

As the contact arm 205 caused the closing of the electrical switch 211 when the shutter plate 203 was in its uppermost position, it is, at this instant, that the flash tube 279 emits a flash of tremendous brilliance, but very short duration, preferably of the order of a ten-thousandth of a second. Thus, the flash occurs while the shutter plate 203 is wide open.

However, before the flash occurs, and while the mirror plate 187, mirror 193 and shutter plate 203 are swinging toward their upward positions, the diaphragm 49 is closed down to its proper stop, which was automatically preset during focusing. This was accomplished as follows: As the mirror-shutter shaft 137 is rotated in a counterclockwise direction (as viewed in Figure 3) by the tension of the mirror return spring 219, the diaphragm opening spur gear segment 141 is similarly rotated. This, in turn, rotates the idler spur gear 145 and the idler bevel gear 147 which, in turn, causes a counterclockwise rotation (looking at it from the front of the camera) of the diaphragm opening bevel gear 151 and the finger 153. The finger 155 is caused to follow the finger 153, under the urging of the diaphragm spring 171, through the train of gears 169, 167, 163 and 159. Such counterclockwise rotation of the finger 155 and the diaphragm control shaft 149, to which it is rigidly secured, likewise causes counterclockwise rotation of the cam follower 157 until the latter engages the cam surface 177 of the cam 173, whereupon further rotation of the cam follower 157, the shaft 149 and the finger 155 is prevented. Thus, rotation of the finger 155 will be stopped when the cam follower 157 strikes the cam surface 177, but the finger 153 may continue its counterclockwise rotation until the shutter plate 203 reaches its upward position, whereupon the flash described above occurs. However, when the flash does occur, the diaphragm 49 has already been closed down to its proper stop.

As the fingers 153 and 155 rotate together, at least until the finger 155 is stopped, due to the action of the cam 173, the diaphragm spring 171 helps to swing the mirror plate 187, mirror 193, and shutter plate 203 upwardly, thereby assisting the mirror return spring 219 in this operation. However, the amount of assistance given by said diaphragm spring 171 will vary with the degree of rotation allowed to finger 155 as controlled by the position of the cam 173. The diaphragm spring 171 will contribute little or nothing, to raising the mirror 193 and its associated parts, when the lens 41 is retracted all of the way, or almost so, as the curvature of the cam 173 is such that the cam follower 157 will then have very little rotation, if any, before engaging the cam surface 177.

To compensate for this reduced assistance, an increased tension is applied to the mirror return spring 219 by virtue of the fact that the rear end of the drive shaft 107 then engages the shoe 217 and pulls down the tension adjusting plate 215 and with it the lower end of the mirror return spring 219. As a result, the time necessary to raise the shutter plate 203 is maintained substantially constant.

In Figures 1 and 3, the rotating back 27 is shown positioned for a horizontal picture. In Figure 2, however, it is positioned for a vertical picture. The back 27 may be rotated to either of said positions without in any way upsetting either the transport of the film 43, or the indication, on the outside of the camera, of the number of frames already exposed, or any other operation. It is accomplished merely by rotating the retracting knob 247 in a counterclockwise direction, which causes the lower end of the retracting arm 243 to move the flange 239 forward against the pressure of the spring 231. This moves the film transport spur gear 237 forward and out of engagement with the ring gear 69. It also retracts the pin 241 from the indexing hole 71 which is then in position behind it.

The entire rotating back 27 is then free to rotate through three hundred and sixty degrees, if desired. As a practical matter, however, the camera will probably only have two indexing holes 71 arranged ninety degrees apart, one for horizontal pictures and one for vertical pictures. Thus ordinarily, the rotating back 27 will merely be turned through ninety degrees. Release of the retracting knob 247 will then allow the pin 241 to drop into the other indexing hole 71, and the film transport spur gear 237 to again intermesh with the ring gear 69, but at a point on said gear 69 ninety degrees removed from the point at which said gear 237 was previously in mesh. The pin 241 and gear 237 will move back into operating position by themselves, under the pressure of the helical spring 231, when the indexing hole 71 is aligned with the pin 241.

When the rotating back 27 is rotated, the aperture plate 55, which is fastened to the rotation plate 73, rotates along with the said back and, hence, when the back 27 is horizontally disposed, the frame opening 57 will also be horizontally disposed. Rotation of the rotating back 27 will also carry with it the shaft 97, which extends through the aperture plate 55, and likewise the sprocket driver spur gear 99 which is attached to said shaft 97. As said spur gear 99 is in mesh with ring gear 69, said ring gear will rotate along with the rotating back 27.

The friction clutch 115 is a safety feature incorporated to avoid damage to the cam surface 177, in the event that the focusing knob 113 is rotated after taking a picture, but before the reset knob 119 has been rotated to move the cam follower 157 out of engagement with the cam surface 177.

It is to be noted that double exposures are prevented, during ordinary use of the camera embodiment just described, for the reason that the shutter plate 203 remains in its closed downward position and can not be raised until the mirror plate 187 is moved downwardly so as to allow engagement between the detents 209 and the detent apertures 191. But while the mirror plate 187 is being moved downwardly, the film 43 is being transported simultaneously to the next frame, and hence before the shutter plate can be raised, unexposed film will be in place.

However, should it ever become necessary to retrigger the camera with the same frame of the film in place, there is a means for accomplishing it. This is done by holding the retracting knob 247 in its retracted position while the reset nob 119 is rotated in its usual way. This effects the various resetting operations, already described, except that the film 43 is not transported to the next frame, as the film transport spur gear 237 is held out of engagement with the ring gear 69.

Although the distance scale 117 will ordinarily be calibrated in distance, it may also be provided with a magnification scale. This would enable an operator to take pictures at a desired magnification by presetting the focusing knob 113 to such magnification and then varying the distance between the camera and the subject to obtain greatest clarity on the ground glass 221.

The rewind knob 277 is always in engagement with the spool in the film cartridge 79 and, therefore, rotates during operation of the reset knob 119, thereby at all times acting as a visual indication that the film transport mechanism is operating.

The operation of the electrical system (Figure 11) is as follows: A flash of light is produced in the gaseous discharge flash tube 279 by building up a high potential, direct current charge in the bank of capacitors 307, then applying this potential to the electrodes of said flash tube 279 and then breaking down the internal resistance of the tube by ionizing the gas by means of a high voltage pulse of electricity applied externally to the tube and along its length by means of the ionizing electrode 283.

More specifically, the power pack is connected to any suitable A.-C. source 291, such as ordinary "house" current. The line switch 295 is then closed to connect the source 291 to the transformer primary 293. Completion of this circuit is indicated by the lighting of the pilot light 297. The diodes 305 then operate as full wave rectifiers in a conventional manner, their filaments being heated by the secondary 299 and a high plate potential being supplied to them by the secondary 301. The center taps of the secondaries 299, 301, respectively thus become the positive and negative terminals of a direct current circuit.

When the diodes 305 heat and rectification begins, a large current of low voltage is first applied to the bank of capacitors 307. The potential between the elements of the capacitors increases with a diminishing current flow until a peak potential exists across said condenser bank, at which time current flow is substantially zero. When said potential has reached a predetermined maximum, the neon lamp 311, acting as a voltage indicator, lights, thus signifying that a full charge has been stored up in the condenser bank and that the camera may be triggered.

When the operator triggers the camera, by pressing upward on the trigger 209, the contact arm 205 on the shutter plate 203 swings upwardly and closes the triggering switch 211, as already described. The closing of this switch 211 closes the circuit between the secondary 303 and the ionizing electrode 283. Although said triggering switch 211 is only closed momentarily, while it is closed it causes activation of the interrupter 319 which causes a rapid making and breaking of the circuit at that point. This making and breaking continues for as long a period as the triggering switch 211 is closed. This relatively high frequency interruption causes a high frequency change of magnetic field in the secondary of the auto-transformer 321, thereby creating an electrical condition of relatively high frequency and high voltage satisfactory for ionization of the flash tube 279, thereby causing a discharge, through the flash tube 279, of the voltage stored up in the bank of capacitors 307 and resulting in a brilliant flash.

The opening of the triggering switch 211, which occurs when the shutter plate 203 and its contact arm 205 start to move downwardly under the urging of the shutter springs 213, opens the circuit through the interrupter 319 and auto-transformer 321. The condenser bank 307 will again be recharged until maximum voltage has been reached, at which time the neon lamp 311 will again be lighted. The camera will now be ready for a second exposure on the operation of the camera exposure trigger.

In the event that light conditions during focusing are poor, the normally open focusing switch 317 may be closed, thereby lighting the focusing bulbs 285 and directing a beam of light therefrom onto the subject. It is immaterial whether the focusing switch 317 is open or closed when the camera is triggered.

It will be understood that the embodiment described above is designed to take film of a particular speed. However, by merely making provision, by any suitable means, for varying the intensity of the light flash, the camera could readily be adapted to utilize films of different speeds.

As already pointed out, the flash tube 279 should preferably be circular and of as small a diameter as possible. This construction has several advantages, among which are that such a light source is thereby enabled to light up deep cavities which are being photographed. This is particularly advantageous when the camera is being used to photograph surgical operative techniques. The opening of the switch 211 has, it will be understood, nothing whatsoever to do with the termination of the flash, as will be evident from the ensuing explanation of the operation.

The function of the tube 279 is as follows: Said tube 279 contains a gas that is a very good insulator under normal conditions, but its resistance is lowered considerably if this gas is ionized. Said tube 279 is provided with electrodes, on either end, across which is impressed a high voltage. As long as the gas remains in its normal state this voltage is not sufficiently high to jump or arc across the electrodes, but upon closing of the switch 211, the gas in said tube 279 becomes ionized, in a manner hereinbefore clearly set forth, thereby lowering its resistance to such a point that the voltage applied across the tube 279 will arc from one end electrode to the other, thus instantly dissipating the charge in the capacitor bank 307. This arc is substantially instantaneous, about $\frac{1}{10000}$ of a second. Actually no switch of any type or description could break fast enough to terminate the arc in the tube. What happens is that as soon as the gas in the tube 279 is ionized, the resistance of that gas breaks down and current starts to flow. This further ionizes the gas to a point away beyond the ionization that originally took place, so that the gas becomes a very good conductor and allows the voltage to flow until it reaches a very low point. At the completion of this arc the gas in the tube 279 then becomes a fairly good resistor, again allowing capacitators 307 to recharge because they are still connected to the charging source, and when they become fully recharged the neon lamp 311 will light, informing the operator that said capacitators are fully charged. But no arc will take place until the resistance of the gas in the tube 279 is lowered by again completing the ionization circuit.

Another advantage is that such a direct light achieves true modeling in that surfaces which are substantially normal to the light are also substantially normal to the axis of the camera lens. Thus, light from such surfaces is reflected directly into the camera, and light from surfaces angulated thereto is reflected in a diminishing amount relative to the amount of such angularity. The light is of very short duration. Hence, lights and shadows produced by the lighting of the present invention give a "three dimensional" modeling which is particularly valuable in certain types of photography, notably in medical photography as already mentioned.

Still another advantage is that the light direction is constant and, hence, photographs of the same subject at different times to show chronological development will always be similarly lighted and, hence, will not suffer variation due to the difficulty of exactly duplicating light conditions, which is ordinarily true of other types of lighting.

While there has been described what is at present considered a preferred embodiment of the present invention, it will be obvious to those skilled in the art that various changes and modifications may be made therein without departing from the invention, and it is, therefore, aimed in the appended claims, to cover all such changes and modifications as fall within the true spirit and scope of the invention.

What is claimed is:

1. In a photographic camera, a lens, diaphragm adjusting means, focusing means for adjusting the lens to different object distances while the diaphragm is opened to its largest aperture, triggering means, an adjustable stop for limiting the movement of said diaphragm adjusting means in one direction to control the amount of the diaphragm opening, means connecting said stop to the lens to vary the position of the stop as the lens is adjusted in focusing, and means connected with the diaphragm adjusting means and operatively connected to and controlled by the triggering means and brought by the triggering action into contact with said adjustable stop thereby to adjust the diaphragm opening to the object distance before the film is exposed.

2. In a means for adjusting a camera diaphragm, a lens board and lens, focusing means to adjust the lens to the object distance, a cam connected to and movable to and fro with the lens board, a cam follower geared to the diaphragm, means including the lens board to adjust the relative positions of the cam and the cam follower to the object distance while the diaphragm is wide open and the cam follower is out of engagement with the cam, triggering means, shutter means, means connected to the triggering means for moving said shutter means to film exposing position, and means operatively connected to the diaphragm and controlled in action by the triggering means to effect engagement between the cam and cam follower in the first part of the movement of the shutter means to film exposing position.

3. In a photographic camera, a lens, an adjustable diaphragm, a movable shutter, movable means for adjusting the diaphragm, an adjustable stop for limiting the movement of said diaphragm adjusting means in one direction to control the amount of diaphragm opening, focusing means for adjusting the lens to different object distances, means connecting said stop to the lens to vary the position of the stop as the lens is adjusted in focusing, means for moving the shutter to film-exposing position, and means connecting the diaphragm adjusting means to the means for moving the shutter to move said diaphragm adjusting means to the limit determined by said stop during the first part of the movement of the shutter to film-exposing position.

4. In a photographic camera, a lens, an adjustable diaphragm, a movable shutter, movable means for adjusting the diaphragm, an adjustable stop for limiting the movement of said diaphragm adjusting means in one direction to control the amount of diaphragm opening, focusing means for adjusting the lens to different object distances, means connecting said stop to the lens to vary the position of the stop as the lens is adjusted in focusing, means for moving the shutter to film-exposing position, and means connecting the diaphragm adjusting means to the means for moving the shutter to move said diaphragm adjusting means to the limit determined by said stop during the first part of the movement of the shutter to film-exposing position, the means for moving the shutter being operable to move the shutter in one direction to film exposing position and in the opposite direction to closed position, and means connecting the diaphragm adjusting means to the means for moving the shutter to move the diaphragm adjusting means in opposite direction, respectively, on movement of the shutter so that, when the shutter is moved to closed position the diaphragm will be full open and during the movement of the shutter to film exposing position the diaphragm adjusting means will be moved to the limit determined by the stop to close the diaphragm down to the desired opening.

5. In a photographic camera, a lens, an adjustable diaphragm, a movable shutter, movable means for adjusting the diaphragm, an adjustable stop for limiting the movement of said diaphragm adjusting means in one direction to control the amount of the diaphragm opening, focusing means for adjusting the lens to different object distances, means connecting said stop to the lens to vary the position of the stop as the lens is adjusted in focusing, means for locking the shutter in operative position, triggering means for tripping said locking means, means for moving the shutter to film-exposing position when unlocked, and means connected to the triggering means for moving said diaphragm adjusting means to the limit determined by said stop during the first part of the movement of the shutter to film-exposing position.

6. In a camera having a lens and having means to support a sensitized surface, an electrically energized source of light, of great intensity and of a very short duration, built into the camera at the objective-lens end thereof, and movable with said lens in the focusing operation, a plate-like shutter member pivotally supported along one of its edges in the camera for swinging movement upon its said edge as a pivot toward and from picture-taking position, a pivotally mounted mirror having a face-to-face relation with said plate-like shutter member, a stationary plate in the camera and having a light admitting opening and against which stationary plate the shutter plate-like member is supported flatwise prior to shutter-opening movement, means to move said shutter plate-like member and mirror to focusing position flatwise against said stationary plate, said plate-like shutter member, said mirror and said stationary plate all being in the rear of and relatively close to and in substantially longitudinal alignment with the said light source at the objective end thereof, means to swing said shutter plate-like member and said mirror away from said stationary plate, and means including a light switch carried by the camera and a formation upon the shutter member which in the movement of said shutter member and the mirror toward picture-taking position acts upon said light switch to actuate said electrically energized source of light.

7. A photographic camera in accordance with claim 5, but wherein the adjustable stop is a cam that is connected to and is positioned by the focusing movement of the focusing means and wherein there is a cam follower that is connected to the diaphragm adjusting means and that is released by the triggering means to engage the said cam, and thereby to effect the closing down of the diaphragm to the size of opening determined by the focusing means.

8. A photographic camera in accordance with claim 5, wherein the adjustable stop comprises a cam and follower, one of which is connected to the focusing means and is movable therewith in the direction of the longitudinal axis of the cam, the active surface of the cam being inclined to that axis, and wherein the diaphragm adjusting means is connected to the other one of the said parts whereby, upon release of the triggering means, the diaphragm is closed down to the size of opening determined by the focusing means.

9. A photographic camera in accordance with claim 5, but wherein the camera is of the reflex type and said movable shutter comprises a shutter plate pivotally mounted for swinging movement to and from picture-taking position, and wherein the camera is also provided with a light switch actuating formation movable with the shutter plate toward picture-taking position, and wherein an electrically energized source of light is carried by the camera and is provided with a light-actuating switch, and wherein movement of the shutter plate toward picture-taking position causes engagement of said formation with said light-actuating switch when the shutter plate reaches picture-taking position, and consequently the flashing of the said light with the diaphragm opening in its closed-down position.

10. A photographic camera in accordance with claim 5, but wherein there is electric lighting means carried by the camera, and wherein actuating means is provided for actuating said electric lighting means, said actuating means being operatively connected to the shutter to actuate said electric lighting means after the diaphragm is closed down.

11. A photographic camera in accordance with claim 5, but wherein there is film supporting means carried by the camera, in the rear thereof, in functioning alignment with said lens, the adjustable diaphragm, and the shutter, and wherein there is a reset knob upon the camera body, and film transport means within the camera body, and wherein there are operating connections between said transport means and said reset knob, so that the transport means may be operated before the triggering means is operated.

12. A photographic camera in accordance with claim 5, but wherein there is a reset knob upon the camera body, and wherein there are operating connections between said reset knob and the adjustable diaphragm, whereby the adjustable diaphragm may be fully opened by manipulation of the said reset knob before the operation of the triggering means.

13. A photographic roll-film carrying camera of the reflex type having a lens and adjustable lens diaphragm and having means to support and to feed a film, a pivoted mirror and a shutter having setting means and release means, a single reset knob-like member upon the exterior of the camera and operatively connected to the film feeding means and to the mirror and the shutter, so that a single manual manipulation of the said reset knob-like member feeds an area and the film into picture-taking position and sets the mirror and the shutter ready for actuation to take a picture, focusing means having a knob-like member upon the exterior of the camera, stop means controlled by the focusing means for determining the size of the aperture of the diaphragm in accordance with the focus setting but leaving the size of the diaphragm aperture unreduced to such established size until triggering, triggering means accessible at the outside of the camera, diaphragm operating means, and means cooperating with said stop means and connected to the diaphragm operating means and cooperating with and under the control of the triggering means, whereby said diaphragm operating means closes down the diaphragm aperture to such established size of diaphragm aperture for the exposure period, and operative connections between said triggering means, said mirror and shutter release means and the means for operating the adjustable diaphragm, to cause picture taking operation of said parts upon movement of said triggering means.

14. A photographic reflex camera having a body, a lens, an adjustable lens diaphragm, focusing means for the lens, stop means controlled by the focusing means for establishing the size of the aperture of the adjustable diaphragm in accordance with the focus setting, a mirror and a plate-like shutter having a face-to-face relation, a shaft in the camera body whereon both said mirror and said shutter are pivotally mounted, means for moving the mirror and shutter to exposure position, a diaphragm-opening-and-closing-down member on said shaft, and operative connections, including a diaphragm control shaft, between said member and said adjustable lens diaphragm to close down the diaphragm to the size of the aperture established by the stop means during the movement of said mirror and shutter toward exposure position.

15. A photographic roll-film carrying camera of the reflex type having a lens and adjustable lens diaphragm and having means to support and to feed a film, focusing means, triggering means, a pivoted mirror and a shutter having setting means and release means, a single reset knob-like member upon the exterior of the camera and operatively connected to the film feeding means and to the mirror and the shutter, so that a single manual manipulation of the said reset knob-like member feeds an area of the film into picture-taking position and sets the mirror and the shutter ready for actuation to take a picture, operating connections between said adjustable lens diaphragm and said reset knob-like member to open fully said adjustable diaphragm with the setting of the mirror and shutter, stop means controlled by the focusing means for establishing the size of the aperture of the adjustable diaphragm in accordance with the focus setting, means for moving the shutter and mirror to film exposing position, and means for closing down, before exposure, the size of the diaphragm opening to that established by the stop means.

16. Means for preventing double exposure in a photographic camera of the reflex roll-film type comprising a camera body having a lens, means to support and to feed the film, a mirror and a plate-like shutter co-axially mounted in the camera body in face-to-face relation with the shutter underlying said mirror, said mirror and said shutter having interengaging disengageable means, means to impart conjoint upward swinging movement to said mirror and said shutter, mirror and shutter releasing means permitting said mirror and shutter to swing upward together, means to disengage the said interengaging disengageable means substantially at the completion of the conjoint upward swinging movement of the said mirror and shutter, means for causing said shutter to move downward to closed position away from said mirror, following disengagement of said interengaging means, means to move the mirror downwardly to effect reengagement of said interengaging means while said shutter is in its down, closed position, and means acting to feed the film while the said mirror is being moved downwardly and the shutter is in its down, closed position.

17. In a photographic camera for use with a light source of predetermined intensity and location, said camera including a lens, in combination, a diaphragm for regulating the aperture of the lens, a shutter, means for actuating said shutter, means for viewing the image, diaphragm operating means actuated by said shutter, means for focusing the lens including a lens-carrying lens board movable to and fro and having inwardly extending therefrom diaphragm opening-determining means including a cam formation, said diaphragm operating means including a cam follower operatively connected to and actuated by the shutter for engagement with said cam formation to establish the area of the diaphragm opening in accordance with the object distance and the distance of the light source from the object, the said cam follower being movable away from the said cam formation in resetting the shutter, whereby the act of focusing the lens establishes the size of the diaphragm opening for exposure.

18. In a camera lens diaphragm adjusting device, in combination, a lens, an adjustable diaphragm, diaphragm operating means, movable focusing means for the lens, a cam connected to and moved by the focusing means in the focusing operation, a cam follower mounted for cooperation with said cam and connected to the diaphragm operating means, means to position the follower relatively to the cam contour, spring means biasing the diaphragm to its smallest opening, said spring means also urging the cam follower into engagement with said cam, latching means for locking the follower away from the cam during focusing, and release means for said latch means whereby when the latching means is released the cam follower will be urged into engagement with the cam surface and the diaphragm will be closed to an aperture corresponding to the object distance.

19. A photographic camera in accordance with claim 3 wherein the camera is provided with a source of artificial light built into the camera and closely surrounding the lens thereof, a light switch carried by the camera and a formation upon the shutter which on completion of movement of the shutter to film-exposing position acts upon said light switch to activate said source of artificial light.

20. A photographic camera having means to support a sensitized surface, a baffle plate supported closely in front of the sensitized surface and having an exposure opening therein, a flat shutter plate constituting the means to obscure the sensitized surface and pivoted at an edge thereof closely adjacent said baffle plate, so as to swing away therefrom to expose the sensitized surface through said exposure opening in the baffle plate, a lens, an adjustable diaphragm for controlling the passage of light through the lens, and constructed to be partially closed down to a position that is variable in accurate accordance with the focus setting, to reduce the amount of light through the lens in making an exposure, diaphragm operating means, focusing means, stop means operated by the focusing means for establishing the size of the diaphragm opening for making an exposure, triggering means, and means controlled by said triggering means for moving the said shutter plate from film obscuring position to film exposing position, means for returning said shutter plate to film-obscuring position, the said diaphragm-operating means being operatively connected to the said shutter plate to close the diaphragm down to the position determined by said stop means on movement of said shutter plate from film-obscuring to film-exposing position.

21. A photographic camera in accordance with claim 20, but wherein there is electric lighting means built into the camera and closely surrounding the lens thereof and provided with a switch, and wherein the said shutter plate is provided with a formation positioned to engage directly with and thereby to operate said switch in its exposure swinging movement, and thereby to flash the said light when the shutter plate is wide open and after the diaphragm is closed down.

22. A reflex camera including a light source of short time duration for flash illumination of an object to be photographed, a swingable reflex mirror plate and a swingable shutter plate having a common axis, a flash switch for energizing the light source, a formation upon one of said plates to engage and actuate the flash switch, a trip for releasing the shutter plate and mirror plate to film exposing position, means to move said mirror plate and said shutter plate together upon their common axis toward film exposing position when the trip is actuated, and cooperating means to disengage the mirror plate and shutter plate from each other after a predetermined angle of movement together to allow return of the shutter plate to film obscuring position, spring means for returning the shutter plate to film obscuring position, said shutter plate having an exposure time appreciably longer than that of the flash duration and means intermediate of and connecting in operation the shutter releasing trip and the flash switch, including said formation upon the said one plate, to cause operation of the light source while the shutter plate is in film exposing position, whereby the entire period of flash duration occurs in the film exposing position of the said shutter plate.

23. In a camera of the reflex type, a casing having a flat mirror pivotally mounted therein and having means to move it toward and from picture-taking position, a lens, and means to support a sensitized surface, a source of artificial light built into the camera and closely surrounding the lens thereof, a flat shutter plate supported flatwise against the mirror before picture-taking movement of the mirror and movable therewith in the picture-taking direction of mirror movement, means to impart to said shutter plate a shutter-closing movement relative to the movement of the mirror, after the shutter plate and mirror have moved together a predetermined distance in the picture-taking direction, and means controlled by movement of the mirror and shutter plate in a picture-taking direction for activating said source of artificial light closely surrounding the lens at a time to admit light rays under said flat shutter plate to the sensitized surface before the completion of the closing movement of the shutter plate.

24. A camera of the reflex type in accordance with claim 23, but wherein the means for activating the source of artificial light so as to admit light rays past the shutter means before the completion of the closing movement of the shutter plate, includes a light switch carried by the camera and a formation upon the shutter plate which, in the movement of the shutter plate and the mirror toward picture-taking position, acts upon said light switch to activate said source of artificial light.

25. A reflex camera including a shutter plate pivotally mounted at one edge, and having means for returning the shutter plate to unoperated position after operation, a mirror plate co-axially pivoted with said shutter plate, a detent means normally holding said shutter plate and said mirror plate in fixed relationship, a latch for retaining the shutter plate and mirror plate in unoperated film-obscuring position, spring means for urging the shutter plate and the mirror plate away from unoperated film-obscuring position, trip means for said latch, and stopping means for said shutter plate upwardly projecting from its edge opposite its pivotal edge, a relatively fixed part against which said stopping means engages upon completion of the movement of the shutter plate away from film obscuring position, whereby the inertia of said mirror plate releases said detent means and the said shutter plate is freed from said fixed relationship and therefore is free to return to unoperated position.

26. A photographic camera of the reflex type having a single flat shutter-plate for obsuring film, co-axially pivoted at its inner edge with, and in combination with, the usual flat mirror plate, and for that purpose having at said edge sleeves aligned with the pivotal sleeve of such mirror plate, a shaft extending transversely of the camera body and upon which the said sleeves are received for up and down swinging movement of said shutter plate and of such mirror plate, and means for imparting such up-and-down swinging movement thereto, a baffle plate below but adjacent to said transversely extending shaft and thence extending downward and providing a light-tight fit with the camera housing and provided with a large, central, rectangular opening, and a shutter gasket upon the upper face of said baffle plate about said opening therein and against which gasket the said shutter-plate makes a light-tight fit when in its downward position.

27. A photographic camera of the reflex type in accordance with claim 26, but wherein the said shutter plate has at its end opposite its pivot an upwardly extending contact arm for closing an electric switch and detents to engage detents on the mirror plate, and wherein there are provided cooperating means to disengage said detents, and at least one helical spring surrounding said shaft and having the ends thereof extending between the said shutter plate and the mirror plate to urge said plates apart.

28. A photographic camera of the reflex type having a shaft extending transversely of the camera body, a single, flat, shutter plate and an overlying flat mirror plate each having a sleeve portion at one end mounted in co-axial alignment upon said shaft, spring means for imparting upward swinging movement to said shutter plate and to said mirror plate with said shaft, co-acting formations upon portions of said plates remote from said shaft for coupling said plates together, and which are in engagement with each other during upward swinging movement of said plates, a projection upon said shutter plate remote from said shaft, and a stop member upon the camera body above and in the path of upward movement of said projection, to stop further upward movement of said shutter plate after contact therewith and thereby causing the disengagement of said co-acting formations, and permitting the further upward movement of said mirror plate and means to move the said shutter plate downward after disengagement of said co-acting formations so as to complete the exposure.

29. A photographic camera of the reflex type in accordance with claim 28, but wherein the said stop member is an electric switch, and wherein there is illumination means carried by the camera, and electrical circuiting means connecting said switch and said illumination means.

30. A photographic camera of the reflex type in accordance with claim 28, but wherein the said stoppage of the upward movement of the shutter plate occurs when the said shutter plate reaches fully operated position, and reset means for swinging the mirror plate back to its unoperated position in contact with the said shutter plate.

31. In a photographic camera of the reflex type primarily intended for photographing objects close to the objective lens, a camera body having therein a movably mounted mirror and a movably mounted shutter plate in close proximity and having interengaging, co-acting, detent formations to hold them together, means to move said mirror and said shutter plate together toward film exposing position, means to disengage the interengaging detent formations substantially at the completion of the movement of the mirror and the shutter plate toward film exposing position, means to move said shutter plate back to film obscuring position, trigger means to release the said mirror and said shutter plate from film obscuring position, said camera body having its front portion prolonged to constitute a flash case surrounding the objective lens of the camera, said flash case being provided with a transparent front wall and also being provided with a central opening directly in front of the said lens, a gaseous-type, two-ended, elongated, flash tube mounted in said flash case and nearly surrounding said objective lens, an electric circuit for said camera and in which said two-ended elongated flash tube is included, a switch in the said circuit for controlling the ignition of said flash tube, and a formation upon the said shutter plate which, in the movement of said mirror and said shutter plate together to film exposing position, engages and closes said switch and thereby causes the ignition of said two-ended elongated flash tube.

32. A reflex camera comprising a body for a lens, and having a wall with an exposure opening therein through which light may be transmitted to a sensitized material, a shutter pivotally mounted to be disposed in front of said opening to cover said opening, a mirror pivoted co-axially with said shutter, means for detachably connecting the shutter and mirror to move together, a spring for swinging the mirror and shutter away from the opening to expose the sensitized material, a latch for detachably holding the shutter and mirror in front of said opening, means for disconnecting the shutter from the mirror after a predetermined swinging movement of the two together, means for thereupon returning the shutter to closing position and separate means for returning the mirror to re-engage the mirror with the shutter.

33. A reflex camera comprising a body for a lens, and having a wall with an exposure opening therein through which light may be transmitted to a sensitized material, a shutter pivotally mounted to be disposed in front of said opening to cover said opening, a mirror pivoted co-axially with said shutter, means for detachably connecting the shutter and mirror to move together, a spring for swinging the mirror and shutter away from the opening to expose the sensitized material, a latch for detachably holding the shutter and mirror in front of said opening, means for disconnecting the shutter from the mirror after a predetermined swinging movement of the two together, and means of sufficient force for returning, and acting to return, said shutter following disengagement of the shutter from the mirror, and an electrically energized source of light, a switch for activating said light, and means carried by the shutter for tripping said switch, and simultaneously disconnecting the mirror and shutter.

34. A reflex camera comprising a body for a lens, and having a wall with an exposure opening therein through which light may be transmitted to a sensitized material, a shutter pivotally mounted to be disposed in front of said opening to cover said opening, a mirror pivoted co-axially with said shutter, means for detachably connecting the shutter and mirror to move together, a spring for swinging the mirror and shutter away from the opening to expose the sensitized material, a latch for detachably holding the shutter and mirror in front of said opening, means for disconnecting the shutter from the mirror after a predetermined swinging movement of the two together, and means of sufficient force for returning, and acting to return, said shutter following disengagement of the shutter from the mirror, and an electrically energized source of light comprising a gaseous-type two-ended elongated flash lamp to be secured to the camera and closely surrounding the lens, a switch for actuating said light source, and means carried by the shutter for tripping said switch and simultaneously disconnecting the shutter from the mirror.

35. In a photographic camera of the reflex type that is provided with a pivotally mounted reflex mirror having a backing plate-like member, a film obscuring shutter plate having a periodic face-to-face relation with respect to said mirror, hinged means positioned transversely in the camera and about which the said shutter plate may be swung upwardly from a downwardly inclined closed position, so as to expose a photographic film, a first spring means for urging the shutter plate to film exposing position, a second spring means for urging the shutter plate to film exposing position, adjustable diaphragm means, means acting on adjustment of said diaphragm means for varying the tension of said second spring means, a movable support to which one end of said first spring means is connected, and means carried by a part of the camera movable in the focusing operation for varying the effectiveness of the first spring means by impinging upon and moving said movable support thereby to compensate for changes in tension of the said second spring means in the normal functioning thereof.

36. A camera comprising a shutter movable to and from film obscuring position, a movable mirror, detent means normally connecting said shutter and mirror to one another, spring means for urging said shutter away from film obscuring position and for simultaneously moving said mirror with said shutter, a movable support for one end of said spring means, means carried by a part of the camera movable in the focusing operation for varying the effectiveness of said spring means by impinging upon and moving said movable support, latching means for normally retaining said shutter in film obscuring position, release means for said latching means, means for disengaging said shutter from said mirror after a predetermined movement of the two together under actuation of the first-named spring means, a second spring means interposed between said mirror and said shutter for urging said shutter toward film-obscuring position, and means automatically operable upon completion of movement away from film obscuring position to release said detent means and to render said second spring means operable to return automatically said shutter into film obscuring position.

37. A photographic camera as claimed in claim 35, in which the said means for urging the shutter plate to film exposing position includes a mirror shutter shaft, a mirror rotating gear segment on said shaft, said shutter plate being pivoted on said shaft, and a coil spring connected to said segment, said movable support being connected to said coil spring.

38. A photographic camera as claimed in claim 35, in which the said first spring means for urging the shutter plate to film exposing position includes a mirror shutter shaft, a mirror rotating gear segment on said shaft, said shutter plate being pivoted on said shaft, a coil spring connected to said segment, said adjustable support comprising a movable tension adjusting plate connected to said coil spring, a lens board having a shaft rearwardly extending therefrom into the path of said tension adjusting plate, and focusing means having a meshing relation with said shaft, whereby in the inward movement of said lens board in the focusing operation, said shaft may engage said tension adjusting plate and increase the tension of said coil spring, and in which there is a shutter diaphragm and a diaphragm spring connected thereto and operatively connected to said shutter plate, and constituting the said second spring means.

39. In a photographic camera, an inclined baffle plate, a film obscuring shutter plate movable from a lower, inclined, closed position against said baffle plate to an upper, open, exposing position, a transversely positioned shaft in the camera upon which the shutter plate is pivotally mounted to be swung upwardly to expose or downwardly to obscure a photographic film, a first spring means for urging the said shutter plate upward to film exposing position, a lengthwise movable upright plate to which one end of said first spring means is connected to stress the said first spring means when moved, and having an inclined lower end, a second spring means for urging said shutter plate upward to film exposing position and being cooperatively related for that purpose to said shutter plate, adjustable diaphragm means, and means acting on adjustment of said diaphragm for varying the tension of said second spring means, a shaft extending in a direction lengthwise of the camera, connected at one end to the lens board of the camera and at its other end extending into proximity to the said lengthwise movable plate, so as in the inward movement of the lens board to impinge upon said inclined lower end of said lengthwise movable plate, thereby to move said lengthwise movable plate downward and consequently further to stress said first spring means to compensate for changes in the effectiveness of said second spring means.

40. In a photographic camera of the reflex type, an inclined baffle plate, a film obscuring shutter plate movable from a lower, inclined, closed position against said baffle plate to an upper, open, exposing position, a transversely positioned shaft mounted in said camera and upon which the shutter plate is pivotally mounted to be swung upwardly to expose or downwardly to obscure a photographic film, a coiled spring constituting a first spring means, for urging the said shutter plate upward to film exposing position, said coiled spring for that purpose being operatively connected in operation at one end thereof to said shutter plate, a slidably mounted, upright plate to which the other end of said coiled spring is connected, a second coiled spring constituting a second spring means for urging said shutter plate upward to film exposing position, an adjustable diaphragm, a diaphragm gear for adjusting said diaphragm and to which one end of said second coiled spring is connected, the other end of said second coiled spring being connected to a fixed part of the camera, so as to be stressed by movement of said diaphragm gear to vary the effectiveness of said second coiled spring, cooperating means between and associated with both said diaphragm gear and said shutter plate, thereby to cause said second coiled spring to co-act with said first mentioned spring in lifting said shutter plate to film exposing position, the said upright plate having an inclined lower end, a slidable camera lens board, a shaft extending rearwardly from said lens board into proximity with said lower inclined end of said movably mounted plate, so as in the inward movement of the said lens board to impinge upon the said lower inclined end of said upright plate, thereby to move said upright plate downward and consequently further to stress said first mentioned coil spring, consequently functioning to stress said first-mentioned coil spring to compensate for changes in effectiveness of said second coiled spring.

ROLLIN W. KING.
EMMANUEL BERLANT.

REFERENCES CITED

The following references are of record in the file of this patent:

UNITED STATES PATENTS

| Number | Name | Date |
|---|---|---|
| 716,021 | Folmer | Dec. 16, 1902 |
| 859,655 | Hall | July 9, 1907 |
| 1,000,343 | Plant | Aug. 8, 1911 |
| 1,124,313 | Pierman | Jan. 12, 1915 |
| 1,284,980 | Azzoni | Nov. 19, 1918 |
| 1,602,483 | Freeman | Oct. 12, 1926 |
| 1,694,750 | Morejin | Dec. 11, 1928 |
| 1,699,906 | Murray | Jan. 22, 1929 |
| 1,736,012 | Parcell | Nov. 19, 1929 |
| 1,788,655 | Beach | Jan. 13, 1931 |
| 1,963,107 | Walters | June 19, 1934 |
| 1,964,722 | Cunningham | July 3, 1934 |
| 1,971,435 | Wear | Aug. 28, 1934 |
| 2,029,238 | Korling | June 28, 1936 |
| 2,137,378 | Billing | Nov. 22, 1938 |
| 2,245,606 | Rauch | June 17, 1941 |
| 2,278,173 | Goering | Mar. 31, 1942 |
| 2,289,827 | Crumrine | July 14, 1942 |
| 2,290,793 | Alderman | July 21, 1942 |
| 2,322,734 | Steiner | June 22, 1943 |
| 2,351,834 | Phillips | June 20, 1944 |
| 2,365,899 | Nadel | Dec. 26, 1944 |
| 2,369,199 | Aiken | Feb. 13, 1945 |
| 2,384,655 | Stewart | Sept. 11, 1945 |
| 2,435,752 | Pearce | Feb. 10, 1948 |
| 2,439,112 | Teague | Apr. 6, 1948 |
| 2,441,370 | Pearce | May 11, 1948 |
| 2,464,559 | Davenport et al. | Mar. 15, 1949 |

FOREIGN PATENTS

| Number | Country | Date |
|---|---|---|
| 4,189 | Great Britain | of 1914 |